(12) United States Patent
Needham et al.

(10) Patent No.: US 8,996,304 B2
(45) Date of Patent: Mar. 31, 2015

(54) CUSTOMIZED TRAVEL ROUTE SYSTEM

(75) Inventors: Bradford H. Needham, North Plains, OR (US); David A. Cobbley, Beaverton, OR (US); David A. Sandage, Forest Grove, OR (US); Matthew D. Wood, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 406 days.

(21) Appl. No.: 13/171,974

(22) Filed: Jun. 29, 2011

(65) Prior Publication Data

US 2013/0006521 A1    Jan. 3, 2013

(51) Int. Cl.
  *G01C 21/00*  (2006.01)
  *G01C 21/34*  (2006.01)

(52) U.S. Cl.
  CPC ................................ *G01C 21/3476* (2013.01)
  USPC ............................. 701/426; 701/302; 701/425

(58) Field of Classification Search
  CPC .. G01C 21/26; G01C 21/343; G01C 21/3469; G01C 21/3476; G01C 21/3484; G01C 21/3679; G09B 29/008
  USPC ......... 701/211, 411, 208, 207, 424, 414, 450, 701/533, 532, 431, 426; 705/26.64, 14, 6; 340/539.11, 404.2; 455/404.02
  See application file for complete search history.

(56) References Cited

U.S. PATENT DOCUMENTS

| | | | |
|---|---|---|---|
| 6,952,180 B2 * | 10/2005 | Jonsson et al. | 342/357.51 |
| 7,031,832 B2 * | 4/2006 | Kawasaki et al. | 701/411 |
| 7,069,238 B2 * | 6/2006 | I'Anson et al. | 705/26.64 |
| 7,512,486 B2 | 3/2009 | Needham et al. | |
| 7,512,487 B1 * | 3/2009 | Golding et al. | 701/424 |
| 7,589,628 B1 * | 9/2009 | Brady, Jr. | 340/539.11 |
| 7,751,968 B2 * | 7/2010 | Yamada et al. | 701/426 |
| 7,853,403 B2 * | 12/2010 | Tanaka | 701/414 |
| 8,090,532 B2 | 1/2012 | Tashev et al. | |
| 8,560,227 B2 * | 10/2013 | Feng | 701/426 |
| 2003/0009281 A1 * | 1/2003 | Whitham | 701/211 |
| 2003/0093217 A1 | 5/2003 | Petzold et al. | |
| 2006/0287815 A1 * | 12/2006 | Gluck | 701/208 |
| 2007/0174042 A1 * | 7/2007 | Thompson | 704/3 |

(Continued)

FOREIGN PATENT DOCUMENTS

KR    10-2009-0000747 A    1/2009

OTHER PUBLICATIONS

International Searching Authority, "Notification of Transmittal of the International Search Report and the Written Opinion of the International Searching Authority," mailed Nov. 29, 2012, in International application No. PCT/US2012/044706.

(Continued)

*Primary Examiner* — Calvin Cheung
*Assistant Examiner* — Thomas Ingram
(74) *Attorney, Agent, or Firm* — Trop, Pruner & Hu, P.C.

(57) ABSTRACT

An embodiment of the invention includes (a) acquiring a tour start location, a tour constraint, and a first user travel preference for a first user; and (b) determining a tour route, including first and second tour segments, based on the tour start location and the tour constraint. The first tour segment is determined based on the first user travel preference. The tour constraint includes a time constraint that is defined by the first user and includes a maximum allowable time for the tour route. Other embodiments are described herein.

19 Claims, 5 Drawing Sheets

(56) References Cited

U.S. PATENT DOCUMENTS

| | | | |
|---|---|---|---|
| 2007/0219706 A1 | 9/2007 | Sheynblat | |
| 2008/0046298 A1 | 2/2008 | Ben-Yehuda et al. | |
| 2008/0120024 A1* | 5/2008 | Obradovich et al. | 701/207 |
| 2008/0153512 A1 | 6/2008 | Kale et al. | |
| 2008/0201227 A1* | 8/2008 | Bakewell et al. | 705/14 |
| 2010/0190468 A1* | 7/2010 | Scott et al. | 455/404.2 |
| 2010/0318291 A1* | 12/2010 | Gluck | 701/208 |
| 2011/0144898 A1* | 6/2011 | Konig | 701/200 |
| 2012/0095675 A1* | 4/2012 | Tom et al. | 701/425 |
| 2012/0143497 A1* | 6/2012 | Van Hende | 701/432 |
| 2012/0150436 A1* | 6/2012 | Rossano et al. | 701/450 |
| 2012/0173134 A1* | 7/2012 | Gutman | 701/400 |
| 2012/0303266 A1* | 11/2012 | Su et al. | 701/420 |
| 2012/0330698 A2* | 12/2012 | Gilliam | 705/6 |
| 2013/0103313 A1* | 4/2013 | Moore et al. | 701/533 |

OTHER PUBLICATIONS

Byte, "Microsoft Patents Bad Neighborhood Detection," Jan. 7, 2012, 2 pages.

Meghan Winters, et al. "Innovative Tools for Healthy Travel: A Web-Based Bicycle Trip Planning Tool," Jun. 2008, 1 page.

The University of British Columbia, "Cycling in Cities," http://www.cher.ubc.ca/cyclingincities/survey.html, Feb. 2009, pp. 1-3.

The University of British Columbia, "Mapping Cycling Trips," http://www.cher.ubc.ca/cyclingincities/neighbourhood.html, Dec. 23, 2010, pp. 1-2.

"Search for Running Maps and Routes," http://www.mapmyrun.com/routes/, pp. 1-2.

Justin Rattner, "Intel: Context Awareness is Future of Experience-Driven Design," Sep. 16, 2010, pp. 1-3.

Wikitude, "Wikitude World Browser," http://www.wikitude.com/en/tour/enwikitude-world-browserdewikitude-world-browser, pp. 1-3.

Cycling Route Planner, "Cycling Metro Vancouver," http://www.cyclevancouver.ubc.ca/cv.aspx, 1 page.

Geovative Solutions, "What is a GeoTour?," http://www.geovative.com/features/whatisageotour.asp, 2011, pp. 1-2.

Qing, Liau Yun, "Navigatin industry to thrive with software dollars," ZDNet.com, http://www.zdnet.com/navigation-industry-to-thrive-with-software-dollars-2062205449/, Jan. 5, 2011, pp. 1-3.

\* cited by examiner

CUSTOMIZED TRAVEL ROUTE SYSTEM

BACKGROUND

Travelers may have different goals for their trips. Some may wish to get from point A to point B in the least amount of time. Others may want a travel experience that takes into account scenery or historical places of interest. However, car navigation systems typically cater to those who want the fastest or easiest driving path. At best, a typical route planner may provide a preference for a certain road surface (e.g., dirt vs. concrete) or "green level" (e.g., urbanscape vs. rural). Meanwhile there exists a variety of routes between points A and B, many of which would provide a more customized and more satisfying trip for the user.

For example, given a starting point of the Portland International Airport (Airport) in Portland, Oreg. and a destination of the O'Bryant Square (Square) in downtown Portland, a conventional route planner may propose a "fast path" that takes the traveler along various relatively unremarkable freeways and the like so as to get the traveler from the Airport to the Square in the shortest time possible. However, an out-of-town visitor may want to see a few cultural aspects of Portland, if the hassle is not too great, before arriving at the Square. With conventional route planners the out-of-town visitor is likely left to tedious manual planning if she or he is committed to seeing something off the predictable beaten path, such as the Portland Museum of Science and Industry (Museum), despite the Museum being only a short jaunt south from the predictable "fast path" between the Airport and the Square. Even with manual planning, the visitor is still likely to arrive at a less than optimal path considering the visitor may be unfamiliar with what points-of-interest are truly worth experiencing.

Also, while there are databases of audio tours, walking tours, running paths, and biking paths, such utilities may only recommend entire routes. In other words, these "canned" tours are not built based on a specific user's preferences such as tour start and stop locations (which in all likelihood do not coincide with the "canned" tour's start and stop locations). For example, the canned routes are not easily adaptable to a larger journey the traveler may be making from point x to point y, where perhaps only a portion of the canned tour might be practically included in the user's trip.

As a result, many users may forego the opportunity to mix interesting travel experiences with practical travel requirements.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "example embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Coupled" and "connected" and their derivatives are not synonyms. "Connected" may indicate elements are in direct physical or electrical contact with each other and "coupled" may indicate elements cooperate or interact with each other, but they may or may not be in direct physical or electrical contact.

An embodiment of the invention generates a travel route by matching possible sub-routes against a user's profile of preferences to dynamically yield a useful travel route that is enhanced with user preferred points-of-interest. Thus, a user can be entertained while still getting to his or her desired destination. Embodiments range from auto navigation systems to route planners for walking, biking, hiking, bus, or boating tours.

Figure 1:
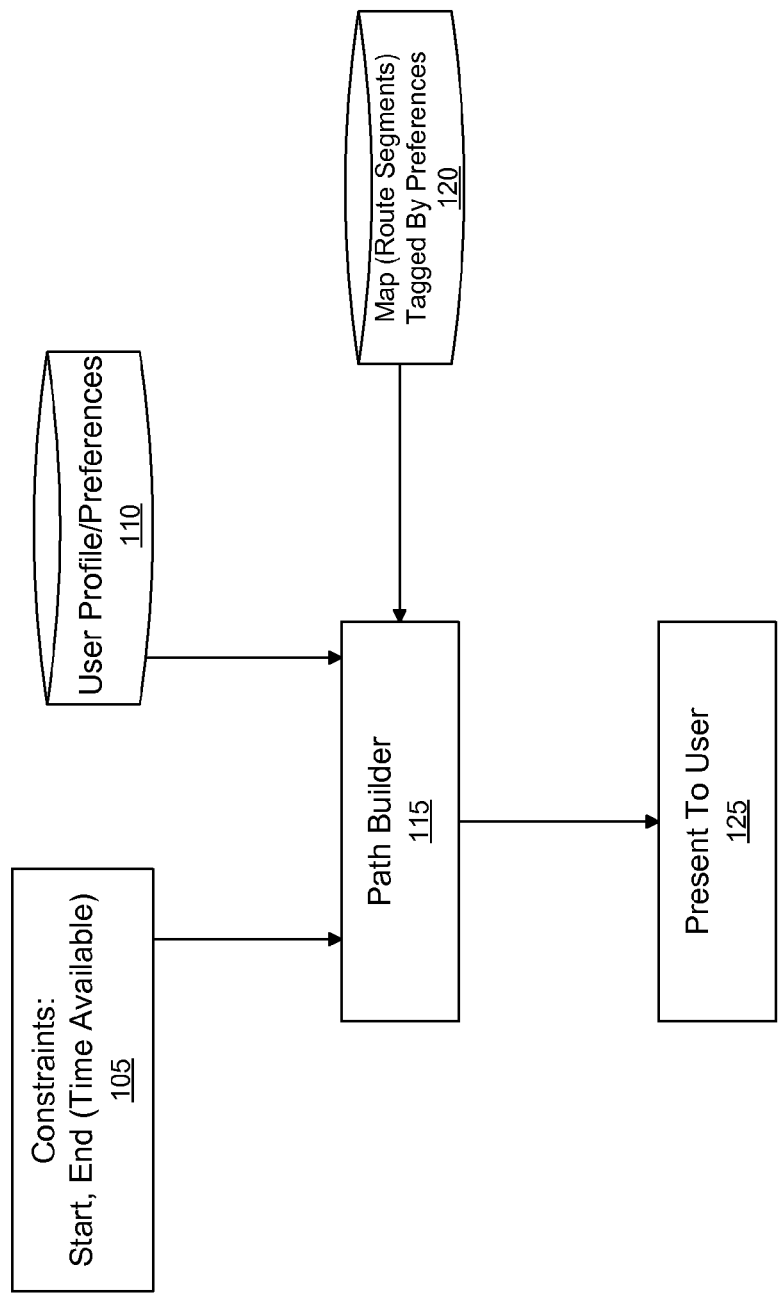
FIG. 1 includes a system in an embodiment of the invention.
Figure 2:
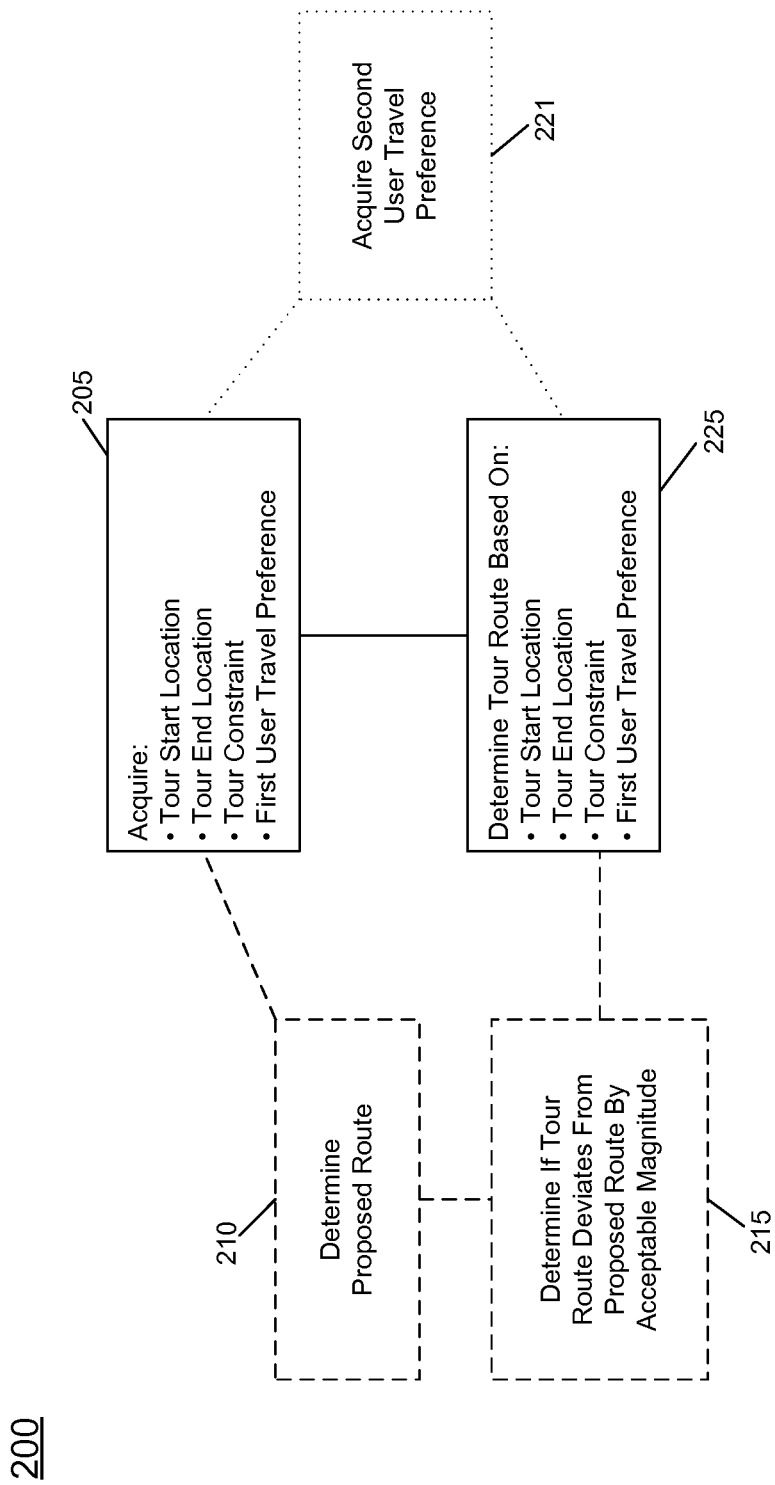
FIG. 2 includes a process in an embodiment of the invention.

FIG. 1 includes a system 100 in an embodiment of the invention and will be discussed more thoroughly after FIG. 2 is discussed. FIG. 2 includes a process 200 in an embodiment of the invention that may be practiced with the system of FIGS. 1 and/or 5. However, the embodiments disclosed in FIGS. 1, 2, and 5 may be performed separate and apart from one another.

In process 200, a user may wish to travel from the Airport to O'Bryant Square in less than two hours while experiencing some cultural highlights of Portland along the way. Process 200 may take the above information and propose one or more routes that take the user from the Airport to the Square in two hours or less while still passing by highlights such as the Portland Museum of Science and Industry. A more detailed explanation of the process follows.

Figure 5:
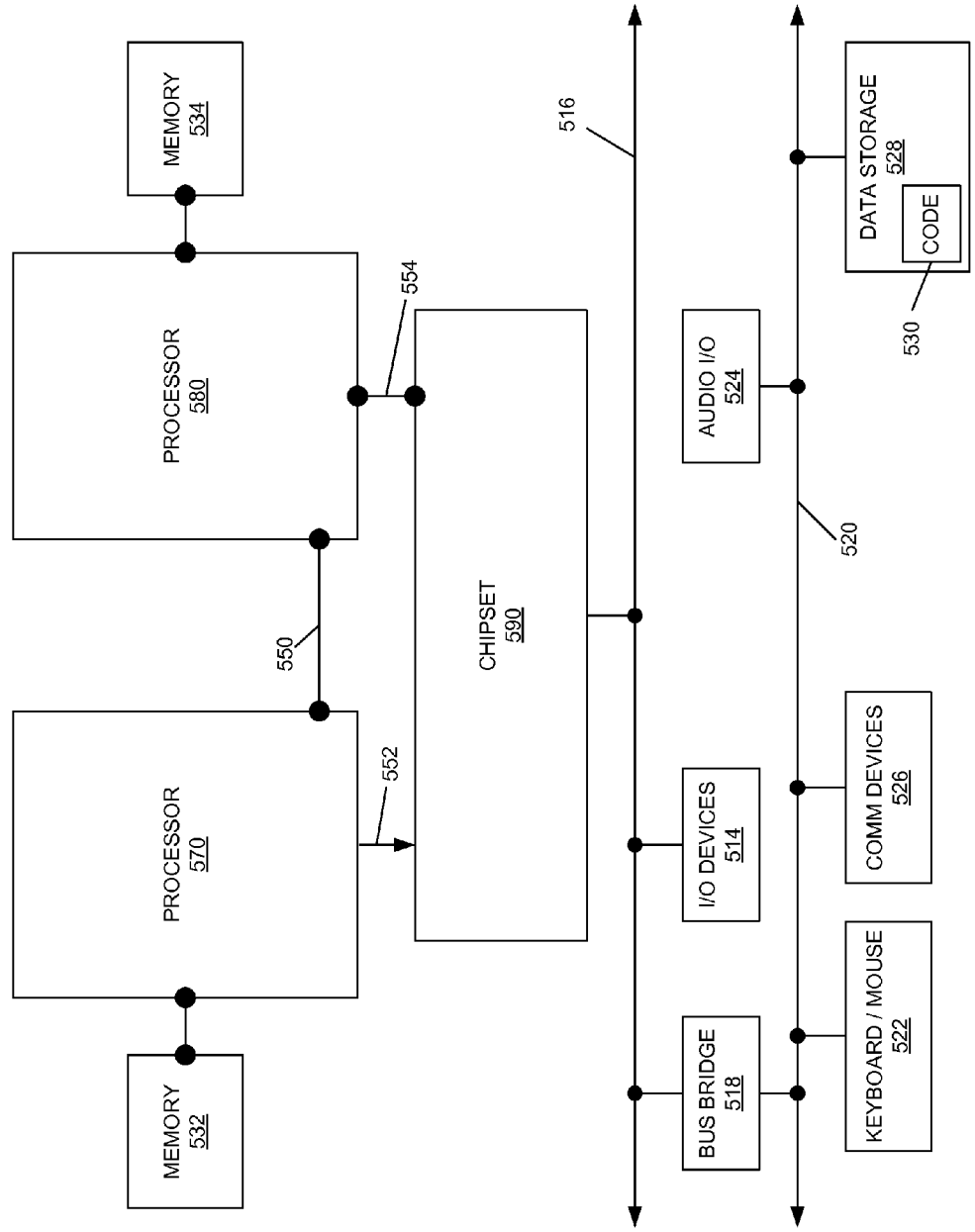
FIG. 5 includes a system for use in an embodiment of the invention.

In block 205 a system (e.g., processor based system running software such as shown in FIG. 1 or 5) acquires a tour start location, a tour end location, a first user travel preference for a first user (explained below), and a tour constraint (explained below).

A user interface (UI), such as a graphical user interface (GUI), may accept entries for these parameters. A specific GUI is discussed below with regard to FIG. 4. Non-graphic interfaces (e.g., audio) may be used as well. Also, parameters need not be entered by a user. For example, the system may couple to a global positioning system (GPS). Thus, the tour start location may be automatically entered based on a reading from the GPS.

A "travel preference" for the user may be one or more of various parameters acquired by the system and used to calculate a route. For example, a preference such as "Fastest route" indicates a preference for the fastest (temporally) route between two points. "Shortest route" indicates a preference for the shortest (distance) route between two points. "Most fuel-efficient route" indicates a preference for fuel savings as addressed, for example, in U.S. Pat. No. 7,512,486. A "Cultural" preference indicates a preference for museums, theaters, playhouses, and the like. A "Desired effort" preference indicates a preference for effort that may be especially relevant to cyclists, walkers, runners, hikers, and swimmers that may want, for example, large changes in grade (e.g., hills) or small changes in grade (e.g., flat). "Scenic route" may indicate a preference for a route with various scenic points, more vegetation than urban vistas, and the like. "Shopping" may indicate a preference for routes that include shopping opportunities. Sub "Shopping" categories may include possible shopping genres such as, for example, couture, antiques, outlet malls, and the like. "Foodie" indicates a preference for food. Sub "Foodie" categories may include possible classifications such as "$$$", "$$", "$", "BBQ", "Seafood" or even rankings from travel databases where the rankings indicate the quality of food served (e.g., 3 of 4 stars) and as recognized by peers, food critics, and the like. "Least Idleness Route" indicates a preference by a user to avoid being stuck in traffic, even if the traffic-heavy route is the fastest path to their destination. Such a route would include segments where the traffic tends to keep moving along. A "ticketless" route may indicate a preference to be knowledgeable of paths where drivers have received a proportionally higher amount of speeding violations than other routes. Such ticket information may be obtained from public records (e.g., Department of Public Transportation records) and the like. "Tourist route" indicates a preference for experiencing various points-of-interest. Points-of-interest may be stored in a database, such as a database operated by a travel publisher and the like. A user interface may cooperate with this preference by, for example, allowing for a search term such as "Portland Museum of Science and Industry" or "Museum" or "historic" or "scenic" to yield the Portland Museum of Science and Industry as a potential point-of-interest to be included on the route. These parameters are just examples and embodiments of the invention are not limited thereto.

Still regarding block 205, a "tour constraint" may be value that sets bounds on the route beyond the bounds of the start and end tour locations. For example, the tour constraint may be related to time or distance. Specifically, the time constraint may be 3 P.M. as in the first user needs to be at the end tour location by 3 P.M. If it is 2 P.M. at the time of the tour route planning, the system may understand the user has only sixty minutes to complete the path. In a similar fashion, the time constraint may instead be a total amount of time as in the first user has only ninety minutes to travel (regardless of whether the end of ninety minutes is 3 P.M., 3 A.M., or any point in between). The time may be a minimum time (e.g., at least two hours) or a range of times (e.g., between two and three hours).

Also, the tour constraint may be based on distance. For example, the total tour distance from start to finish may be no longer than five miles. However, the distance constraint may instead be a minimum distance such as at least 2 miles. The distance may also be an exact amount of distance or even a range of distance (e.g., between two and three miles). Such functionality may be useful to, for example, cyclists, runners, hikers, and kayakers.

In an embodiment, the tour constraint is based on both time and distance constraints.

Block 225 includes determining a tour route. The route may be composed of one or more segments used to link tour start and end points. The proposed route segments may be calculated based on the tour start and end locations, the tour constraint, and the user travel preference. Thus, a person may wish to go from the Airport to the downtown Square in two hours taking into account his or her preference for "cultural" points-of-interest. A resultant route may take a path that is not the most efficient (in terms of distance or time) but which passes by the Museum—all within two hours start to finish. In other words, one of the many segments in the tour route may extend to or past the Museum. Thus, that particular segment is selected based on the user's "cultural" preference.

FIG. 2 includes an option denoted by the dotted line and block 221. There a second user travel preference is acquired. In block 225, one or more segments may then be chosen based on both the first and second user travel preferences. For example, choosing "cultural" and "scenic" may provide a single segment that satisfies both of these "first" and "second" travel preferences. However, an embodiment may allocate a first segment to the "cultural" aspect (e.g., the Museum) and another segment to the "scenic" aspect (e.g., Waterfront Park).

In an embodiment, the system may weigh the first user travel preference with a first weight and the second user travel preference with a second weight. The weights may be predetermined by the system or selected by user. For example, the user may face a GUI with sliding scales between preferences wherein the totality of all the sliding scales equals 100%. Consequently, if "cultural" is at 75% and "scenic" at 25% the route may select the Museum first and only select Waterfront Park if doing so does not deviate much at all from the most efficient path from the Museum to the desired tour end point (e.g., downtown Square). Weighting is discussed further below.

Still regarding block 221, in another embodiment a second user travel preference is acquired but this time the preference is for a second user (i.e., not for the first user). Now a tour segment or multiple segments may be based on first and second preferences from multiple users. For example, a car may have a driver (first user) and a passenger (second user). The system may be marked to include a "cultural" preference for the driver and a "kiddie" preference for the passenger, where "kiddie" indicates a preference for points-of-interest suitable for children (e.g., playgrounds, child museums). Thus, a tour may be formed that includes a trip to children's museum or to an adult museum near a playground. As indicated above, in an embodiment the two preferences may be weighted unequally. Thus, the driver may choose to more heavily weigh "cultural" on a Sunday but more heavily weigh "kiddie" on a Saturday morning according to the user's preferences.

FIG. 2 includes another option denoted by the dashed line and blocks 210 and 215. In block 210 the system determines a proposed route between the tour start location and a tour end location. This proposed route may be a "most efficient" route in terms of time needed to go from the starting location to the ending location. A touring time for the proposed route may be calculated. For example, the most efficient route between the Airport and the downtown Square may be about twenty minutes. However, the system may also determine a touring time for the alternative tour route that includes a side trip to the Museum. To travel from the Airport to the Museum and then to the Square may take thirty minutes. Thus, the second tour may take ten minutes longer than the most efficient route.

In this embodiment the tour constraint may set out an amount of time, which is above and beyond the most efficient route that is acceptable to the user. Thus, a user may say a little sight-seeing is fine as long as it doesn't add on more than twenty minutes to length of the entire trip.

As indicated in block 215, if the user set the tour constraint to be time focused (as opposed to distance focused) and to be twenty minutes, and the route differential is only ten minutes, the tour generator may propose the cultural route because it "satisfies" the tour constraint (e.g., it only adds ten minutes to the total trip time and ten minutes is less than the twenty minute constraint threshold) and also works in a cultural aspect to the drive.

In another embodiment, blocks 210 and 215 could be more related to distance. For example, in block 210 the system determines a proposed route between the tour start location and a tour end location. This proposed route may be a "most efficient" route in terms of distance between two locations. A touring distance for the proposed route may be calculated. For example, the most efficient route between the Airport and the downtown Square may be about twelve miles. However, the system may also determine a touring distance for the alternative tour route that includes a side trip to the Museum. To travel from the Airport to the Museum and then to the Square may be about thirteen miles. Thus, the second tour may take one extra mile than the most efficient route.

In this embodiment the tour constraint may set out a distance, which is above and beyond the most efficient route that is acceptable to the user. Thus, a user may say a little sightseeing is fine as long as it does not add on more than two miles to length of the entire trip.

As indicated in block 215, if the user set the tour constraint to be two miles, and the route differential is only one mile, the tour generator may propose the cultural route because it "satisfies" the tour constraint (e.g., it only adds one mile to the trip and one mile is less than the two mile threshold) and also works in a cultural aspect to the drive or run.

In an embodiment compatible with any version of FIG. 2 described above, a method may include acquiring a tour end location where the tour start location generally equals the tour end location. For example, a loop or "out and back" running route may be desired for a visiting runner staying at a hotel near the downtown Square. The tour constraint may be two miles where in the embodiment the two mile constraint means the total mileage of the route should be no more than two miles. The user preferences may be set to "Foodie" and "scenic". Based on the constraint and preferences, the generated route may take the runner on a two mile trip that allows the runner to preview potential eateries (based on "foodie" preference) while possibly incorporating a run through a park (based on "scenic" preference).

In an embodiment, if the user prefers a tour constraint based on time, a sub-preference category may represent the user's skill. For example, with a running route the runner's skill could be categorized as, for example, "expert runner", "intermediate runner", "beginning runner" and the like. The three classes of runner levels (or cyclist levels, hiking levels, and the like) may respectively translate to six, eight, and ten minute miles to help calculate the time of potential routes where distances are known. For example, a twenty minute route for a beginner runner should be about two miles long.

Figure 3:
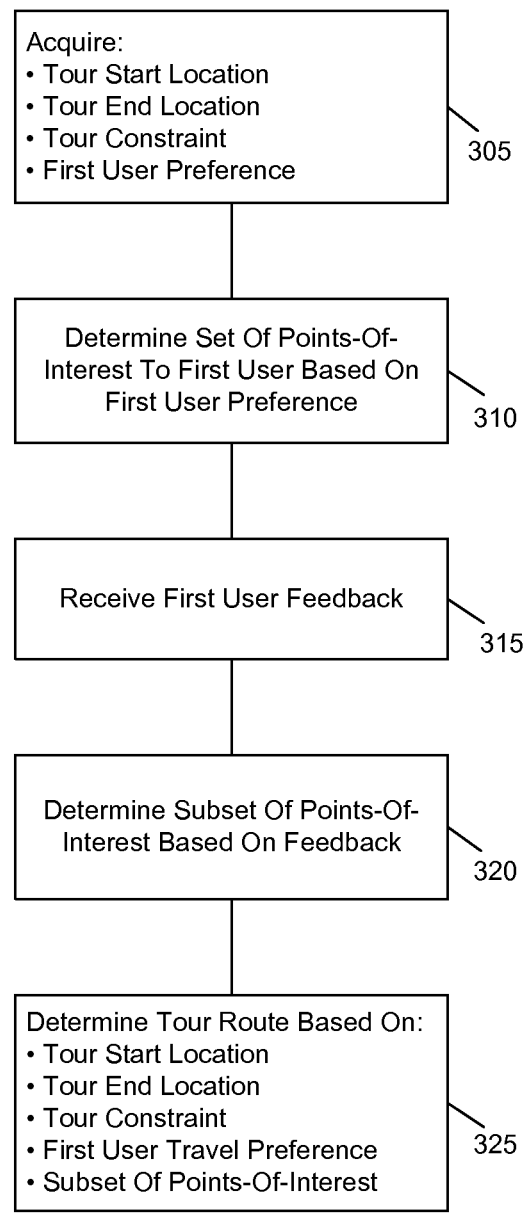
FIG. 3 includes a process in an embodiment of the invention.

FIG. 3 includes a process 300 in an embodiment of the invention that may be practiced with, for example, the systems of FIGS. 1 and/or 5. However, the embodiments disclosed in FIGS. 1, 3, and 5 may be performed separate and apart from one another.

In block 305 a system (e.g., processor based system running software) acquires a tour start location, a tour end location, a tour constraint, and a first user travel preference for a first user.

In block 310 a set of points-of-interest to the first user are determined based on the first user travel preference. For example, a user whose preferences include "cultural" and "scenic" may obtain a set of points-of-interest that includes the Portland Museum of Science and Industry, Architectural Heritage Center, Museum of Contemporary Craft, Director Park, Mill Ends Park, and Waterfront Park. This set of points-of-interest may be provided to the first user. All of these points-of-interest may be possible segments for a two hour tour that extends between the Airport and the downtown Square.

However, in block 315 the user may not desire to see all of these sites. Thus, the user may select less than all of the points-of-interest such as, for example, only the Portland Museum of Science and Industry and the Museum of Contemporary Craft. Thus, a subset of points-of-interest is determined (block 320).

In block 325, a tour route may then be created including the Airport, downtown Square, the Portland Museum of Science and Industry, and the Museum of Contemporary Craft.

As indicated above, "points-of-interest" embodiments may be combined with the tour constraint embodiments so that the tour including the Airport, downtown Square, the Portland Museum of Science and Industry, and the Museum of Contemporary Craft may all be within the bounds of a maximum two hour tour. However, "points-of-interest" embodiments (as well as other embodiments) may be independent of tour constraints. For example, embodiments may simply create the large set of points-of-interest based on the user preference (or preferences from one or more users) and determined a tour based on selected subset of points-of-interest and start and finish tour locations with no regard to distance or time constraints.

In an embodiment, a method may include labeling route segments. For example, first and second tour segments may be visually illustrated on a map. One of the segments may then be graphically labeled with a graphic label that is distinct from the illustrated first tour segment. The label may be based on the first user travel preference. For example, a green line overlaying a map may indicate a tour segment. Next to the green line may be a picture of the Museum. In such an embodiment, a user may quickly see there is a segment dedicated to passing the Museum in route from the Airport to the downtown Square. If the user determines the Museum-based segment is too far afield from the main tour between the Airport and Square, the user can delete that segment by, for example, deselecting the Museum point-of-interest.

In another embodiment, a method may include labeling route segments in a slightly different manner. For example, first and second tour segments may be included in a tour route. One of the segments may be labeled (non-graphically) with an audio file based on the first user travel preference. In such an embodiment, when a user passes by the Museum a GPS, coupled to the system, may determine the user system is closer than a threshold distance to the point-of-interest Museum. Based on the determination the audio file begins to play so the user is alerted to his or her proximity to the point-of-interest. This may be particularly useful in situation where the point-of-interest is discreet such as, for example, a nondescript birthplace of a certain person. In another embodiment, an augmented reality episode may overlay a visual display of a point-of-interest. For example, a Smartphone displaying point-of-interest building (via a camera included in the Smartphone) may have, overlaying the building display, an arrow pointing to a famous architectural detail of the building.

Other types of tagging or labeling are possible. For example, path segments may be graphically tagged according to relative effort (e.g., "flat", "steep climb"), time required to traverse the segment, and the like. Also, a weight may be graphically labeled on the segments. For example, utilitarian routes may be marked in brown. Such routes may represent a route out of the Airport that is rather essential to any reasonable path to the downtown Square. However, other segments of the route may be optional. If the segments are weighted according to user preferences, the weights may be graphically illustrated.

Figure 4:
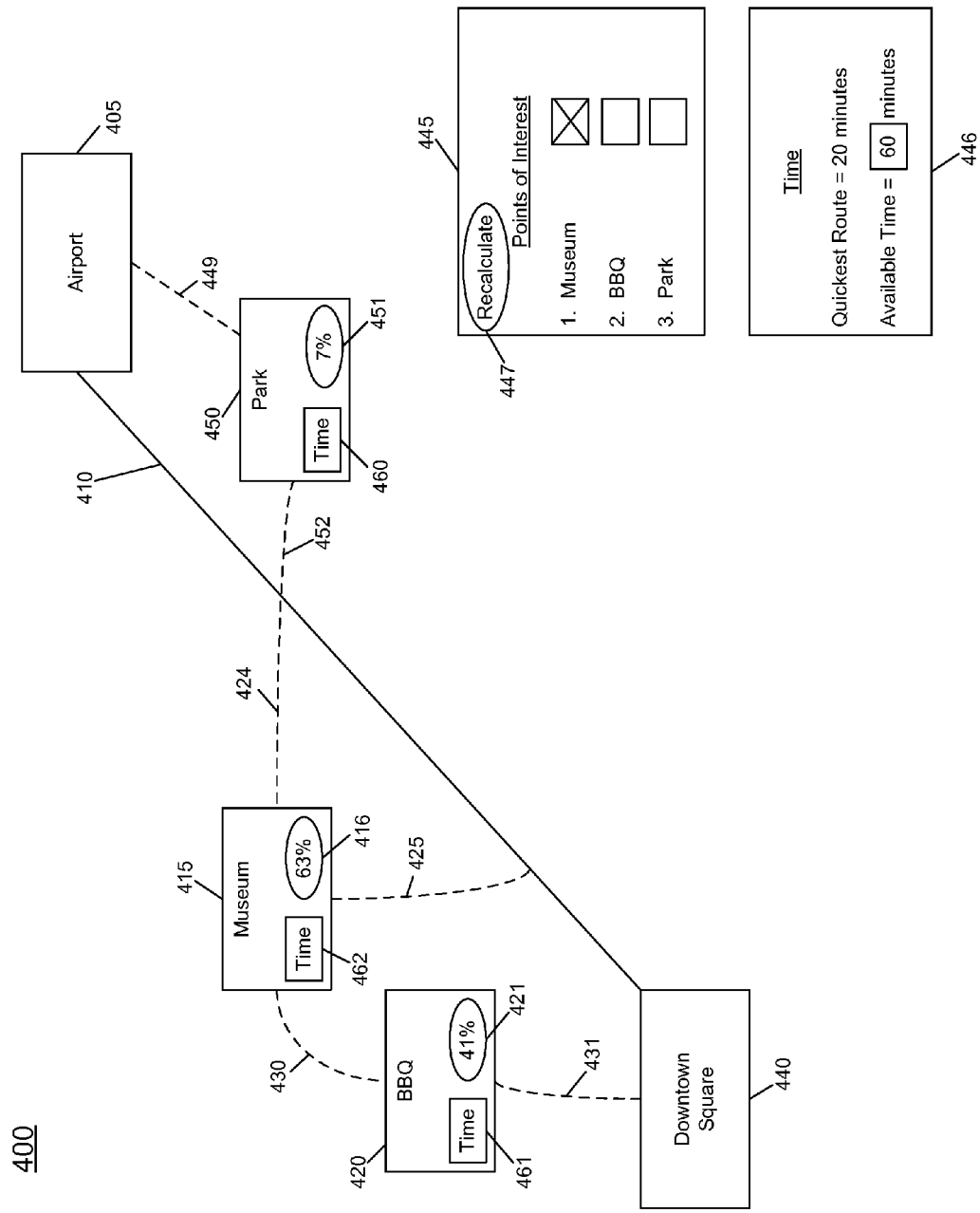
FIG. 4 includes a user interface in an embodiment of the invention.

For example, FIG. 4 includes user interface 400 in an embodiment of the invention. The user desires to travel from Airport 405 to downtown Square 440, but possibly see some points-of-interest along the way if they are not too far afield from the most efficient route. Based on a prior preference profile created by the user, a museum, a "three star" ranked BBQ restaurant, and a relatively nondescript park are included in box 445. These three points-of-interest are provided in the set because they match (to some degree) preferences of the user and a trip to see them may, along with getting from the Airport to the Square, satisfy the user defined sixty minute time allotment made in box 446. Box 446 may also show the time for the fastest route is twenty minutes. Thus, there is about an extra forty minutes to venture off the direct path. User interface 400 also shows the museum 415, BBQ restaurant 420, and park 450 and their relation to the "fast path" 410. If the user wishes to only see a subset of the points-of-interest he or she may evaluate the weighted percentages that are respectively 63% (block 416), 41% (block 421), and 7% (block 451). Based on user preferences, block 416 shows the Museum is likely of most interest to the user. Box 445 shows the user has selected to see only museum 415. After making the selection in box 445 the user may select the "recalculate" button 447 to dynamically recalculate the tour. The recalculated tour (not shown) may remove routes 430, 431, 449, 452 and blocks 420, 450 resulting in a more streamlined path of segments 410, 424, 425 (not shown). As an alternative, a user may simply "right click" undesired segments to remove those segments from the route.

Various embodiments include dynamic routing features. An embodiment actually suggests mid-course corrections to the user. For example, as a user travels from the Airport to the downtown Square along the most direct route suggested, the system may volunteer information such as "You are only 10 minutes from the Portland Museum of Science and Industry" even though the Museum is not a designated segment on the user's route. For example, this may be useful to a jogger who may not appreciate how close he or she is to a possible valued point-of-interest. In an embodiment, the alert may be conveyed via visual and/or audio means.

In an embodiment, such alerts may be set to occur only if the point-of-interest has a weighting that satisfies a threshold. For example, a lover of sports may not be interested in knowing he or she is two blocks from a museum of moderate renown. Such a museum may fail to satisfy that particular user's alert threshold and thus, no alert would be given.

In an embodiment, the alert may occur when the additional point-of-interest (not included in the tour route) is within a threshold distance of the first user. For example, when the user is within one mile of the additional point-of-interest the alert may occur.

In an embodiment, user interface 400 may include time boxes 460, 461, 462 respectively for potential points-of-interest 450, 420, 415. Thus, a user may enter sixty minutes in box 461. The system may then dynamically recalculate a route to determine if a route from the Airport 405 to the downtown Square 440, via a sixty minute "layover" at BBQ restaurant 420, still satisfies any tour constraint such as two hours for the entire tour. If spending one hour at restaurant 420 would only leave thirty minutes of leeway for the two hour trip, the system may automatically populate box 462 with thirty minutes and remove box 450 entirely.

In an embodiment, multiple routes may be offered (e.g., displayed) simultaneously to better provide the user with optional routes to consider.

FIG. 1 includes a system 100 in an embodiment of the invention. Database 110 may include store preferences for a user. For example, a user may have a permanent profile stored on database 110, which is located on a remote server accessed via the cloud. In fact, a user may have several profiles stored such as "business mode", which selects no frills fastest path options, "pleasure mode" which selects a plurality of preferences heavily weighted on parks and culture related preferences, and "foodie" mode which heavily weighs highly ranked food establishments. Of course, preferences may be selected on the fly to dynamically customize a route according to the whims of a user on any given day.

Box 105 includes constraints which may be entered via a user interface. Block 115 includes a path builder.

Path builder 115 may construct possible paths based on constraints and user preferences. In an embodiment, the path builder may use, for example, a graph of weighted arcs to build the path. The weighted arcs may be based on the "shortest path" problem (i.e., graph theory) and its solutions. To calculate the weight per arc in a multi-dimensional space, in an embodiment there is a global function, $f(ABw1, ABw2, ABw3 \ldots)$ that, given a set of weights (w1, w2, w3 corresponding to different factors such as "cultural", "scenic" and the like) of arc AB (i.e. a route segment), produces a single real number weight to be associated with the arc AB. That function can be, for example, a simple sum, an average, a maximum, a minimum, a weighted average (e.g., "I like buildings 50% more than 1 like scenic areas"), a weighted sum, or other combinatoric function that produces a single real number per arc.

In an embodiment weights may be derived based on multiple people's profiles (e.g., one embodiment of block 221 in FIG. 2). This may be based on deriving a group profile from a set of individual profiles, and then applying that one profile to the application. This may entail optimizing a route for the fictitious "common" person of the group. However, in another embodiment weights may be derived by expanding the number of weights that are input to the weighting function: $f(P1ABW1, P2ABW1 \ldots P1ABW2, P2ABW2 \ldots)$, where different persons (P1, P2) and different weights (W1, W2 are preferences respectively for users P1, P2) are used to weight arc AB. The weighted arc is thus optimized for all the people in the group.

In one embodiment, the path builder iteratively executes based on driving actions of the user. In other words, if the user deviates from the planned route the system may adjust and adapt to the user's new position. Box 115 may interact with maps stored in box 120 to generate a proposed route to the user (box 125). Box 125 may include a presentation/transfer module responsible for displaying the chosen route(s) to the user and/or transferring the chosen route to a turn-by-turn navigation module.

In an embodiment a system may optimize a user profile, such as the ones stored in unit 110, based on historical user behavior. For example, a set of variables may be inferred from user behavior such as driving behavior. A driver might frequently pass by historic houses and buildings; another driver may instead prefer driving past clubs and night spots; and another driver might enjoy driving through rural areas. The above historic, entertainment, rural preferences may be inferred from the historical tracking data (e.g., derived from GPS).

An embodiment presents a set of alternatives to the user, then uses the feedback (explicitly through a user interface or implicitly by observing which path the driver takes) to make better recommendations later. For example, a feedback-based route recommender may be used. This component may instead be a simple "choose one" menu offered to the user. For example, the user may choose one of "Fastest", "Rural", "Urban", "Historic", "Scenic", "Night life", or "Shopping routes".

In an embodiment pattern tracking may be segmented. For example, the pattern may optionally exclude driving patterns between 6 A.M. and 9 A.M. Monday through Friday to avoid detecting patterns that are inaccurately influenced by a utilitarian morning commute to work. In an embodiment, the pattern may segment long trips from short trips. The pattern may learn from user selections/deletions of suggested "points-of-interest" in box 445 of FIG. 4.

Profiles may be created in numerous other ways. A user may select one or more preferences from a list. A user may answer a set of questions that make up their preferences. For example, "Do you like architecture", "What is your annual income?", "What is your highest level of education?", "Do you own season tickets for a sports team?", "Where do you live?", "Do you have children under the age of 10?", and the like. The answers are then processed to produce the user profile. That is, the questions are mapped into a hidden (to the user) set of dimensions of their preferences. A person that likes architecture, has a high annual income, and a high level of education may be summarized as a user interested in "intellectual pursuits". In contrast, if a person answers questions indicating she or he likes high-speed roads, vistas, and tall bridges the application may summarize the responses as a person that enjoys "driving thrills". Even a response indicating a person enjoys "hot food" might affect their navigation-related profile as being "adventurous".

In an embodiment, a user's dynamic state (vs. static preferences) may affect the profile. Examples of user's state are: emotional state (e.g., angry, calm, agitated, inactive), their current activity (e.g., driving to/from work, out for a Sunday drive, driving to pick up the dry cleaning, driving on vacation), or biological state (e.g., time since a meal, time since a bathroom break).

An embodiment may infer a profile from the more general behavior of the user or the user's friends. For example, if a person's friends (e.g., expressed in a social network) post a large number of scenic photos, the inferred profile might include "likes scenic areas".

Thus, in an embodiment a profile may be a combinatoric function of weights (e.g., f(ABW1 ... )) that can be mined from data that bears on the user's or set of users' preferences. For example, an application might use a person's movie provisioning service to produce a weighting function based on the type of movie purchases/rentals made by the user.

Any of these methods can be iterative anywhere on the spectrum from enter-once (and never update) to enter-continuously (the user providing continuous feedback on how well the system's recommendations match their actual preferences).

Embodiments are not limited to tour constraints concerning, for example, distance and/or time. For example, an embodiment includes a tour constraint focused on fuel. A user may allot a maximum amount of fuel that may be consumed during the tour. The constraint may have a maximum of X kilowatts of energy, Y gallons of gas, and the like. This information may be coupled with, for example, traffic patterns, road grades, and efficiency of the vehicle to be used during the tour in order to generate a tour in keeping with the tour constraint. As with other embodiments, the tour constraint may allow for an "additional" burden so, for example, a runner may limit a deviation such that she or he burns no more than an extra 500 calories for a deviation from a most direct running route (e.g., runner is willing to exert no more than an extra 500 calories to see the Museum instead of just running the most direct route).

In an embodiment, another tour constraint may be a cognitive restraint. For example, a cognitive load constraint may guard against complexity of routes. A "low cognitive load" may avoid complex highway interchanges, roads with traffic circles, routes with greater than X turns, areas without plentiful parking, and the like. This may be beneficial to those with cognitive concerns such as certain disabled individuals, beginning drivers, and the like. The cognitive load may limit "additional" burdens such as, for example, a willingness to see any point-of-interest scoring greater than 50% of interest to a user profile provided going to see the point-of-interest would not include a segment of "medium" or "high" cognitive load. Such a user may be willing to go out of his or her way provided no "high" cognitive load tour segments will be included (e.g., a left turn across 4 lanes of traffic without a light, changing lanes in less than one block, and the like). Similarly, cognitive load could be factored into segment weighting as described above (which may ultimately lead to segment selection based on cognitive load).

Embodiments may be included in applications for notebooks, personal digital assistants, Smartphones, In-Vehicle-Infotainment systems (e.g., systems included or coupled to vehicle communication systems), on-line mapping utilities, navigation devices, and the like.

Embodiments may be implemented in many different system types. Referring now to FIG. 5, shown is a block diagram of a system in accordance with an embodiment of the present invention. Multiprocessor system 500 is a point-to-point interconnect system, and includes a first processor 570 and a second processor 580 coupled via a point-to-point interconnect 550. Each of processors 570 and 580 may be multicore processors. The term "processor" may refer to any device or portion of a device that processes electronic data from registers and/or memory to transform that electronic data into other electronic data that may be stored in registers and/or memory. First processor 570 may include a memory controller hub (MCH) and point-to-point (P-P) interfaces. Similarly, second processor 580 may include a MCH and P-P interfaces. The MCHs may couple the processors to respective memories, namely memory 532 and memory 534, which may be portions of main memory (e.g., a dynamic random access memory (DRAM)) locally attached to the respective processors. First processor 570 and second processor 580 may be coupled to a chipset 590 via P-P interconnects, respectively. Chipset 590 may include P-P interfaces. Furthermore, chipset 590 may be coupled to a first bus 516 via an interface. Various input/output (I/O) devices 514 may be coupled to first bus 516, along with a bus bridge 518, which couples first bus 516 to a second bus 520. Various devices may be coupled to second bus 520 including, for example, a keyboard/mouse 522, communication devices 526, and data storage unit 528 such as a disk drive or other mass storage device, which may include code 530, in one embodiment. Further, an audio I/O 524 may be coupled to second bus 520.

Embodiments may be implemented in code and may be stored on a non-transitory storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions. Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. Components or modules may be combined or separated as desired, and may be positioned in one or more portions of a device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory storage medium having instructions stored thereon to cause a system to perform operations comprising:
   acquiring a tour start location, a time constraint, and a first user travel preference for a first user; and
   determining a proposed tour route, which has yet to be traversed and which includes first and second tour segments, based on the tour start location and the time constraint;
   determining a proposed route, which has yet to be traversed, between the tour start location and a tour end location;
   determining a touring time for the proposed route;
   determining a touring time for the tour route;
   determining a time differential between the touring time for the tour route and the touring time for the proposed route; and
   communicating at least one of the first and second tour segments to the first user;
   wherein (a) the first tour segment is determined based on the first user travel preference, (b) the time constraint is greater than the time differential, and (c) the first user travel preference is not the tour start location or a tour end location.

2. The at least one medium of claim 1, wherein the time constraint is defined by the first user and corresponds to a detour time from the touring time for the proposed route that is acceptable to the user.

3. The at least one medium of claim 1 including:
   acquiring a distance constraint;
   determining a touring distance for the proposed route;
   determining a touring distance for the tour route; and
   determining a distance differential between the touring distance for the tour route and the touring distance for the proposed route;
   wherein the distance constraint is greater than the distance differential.

4. The at least one medium of claim 1, the operations including acquiring a tour end location, wherein the tour start location generally equals the tour end location.

5. The at least one medium of claim 1, wherein an additional time constraint is user defined and includes a minimum allowable time for the tour route.

6. The at least one medium of claim 1 including:
   acquiring a second user travel preference for a second user;
   wherein the first tour segment is determined based on both the first and second user travel preferences.

7. The at least one medium of claim 1, the operations including:
   providing a set of points-of-interest to the first user based on the first user travel preference;
   receiving feedback, from the first user, regarding the set of points-of-interest;
   determining a subset of the set of points-of-interest based on the feedback; and
   determining the tour route based on the subset of points-of-interest.

8. The at least one medium of claim 7, the operations including determining the set of points-of-interest based on the time constraint.

9. The at least one medium of claim 7, the operations including, while the first user is traversing the tour route, alerting the first user that a point-of-interest not included in the tour route is within a user defined threshold distance of the first user.

10. The at least one medium of claim 1, the operations including illustrating the tour route and the proposed route on a map.

11. The at least one medium of claim 1, the operations including:
    acquiring a second user travel preference for the first user; and
    weighting the first user travel preference with a first weight and the second user travel preference with a second weight;
    wherein the location of the first tour segment is determined based on the first and second weights.

12. An article comprising a non-transitory medium storing instructions that enable a processor-based system to:
    acquire a tour start location, a distance constraint, and a first user travel preference for a first user; and
    determine a tour route, including first and second tour segments, based on the tour start location and the distance constraint;
    determine a proposed route between the tour start location and a tour end location;
    determine a touring distance for the proposed route;
    determine a touring distance for the tour route;
    determining a distance differential between the touring distance for the tour route and the touring distance for the proposed route; and
    communicating at least one of the first and second tour segments to the first user;
    wherein (a) the first tour segment is determined based on the first user travel preference, (b) the distance constraint is greater than the distance differential, (c) the first user travel preference is not the tour start location or a tour end location; and (d) the distance constraint corresponds to a detour distance from the proposed route that is acceptable to the user.

13. The article of claim 12 storing instructions that enable the system to:
acquire a time constraint;
determine a touring time for the proposed route;
determine a touring time for the tour route; and
determine a time differential between the touring time for the tour route and the touring time for the proposed route;
wherein the time constraint is greater than the time differential.

14. The article of claim 13 storing instructions that enable the system to determine a set of points-of-interest based on the time constraint.

15. The article of claim 12 storing instructions that enable the system to:
provide a set of points-of-interest to the first user based on the first user travel preference;
receive feedback, from the first user, regarding the set of points-of-interest;
determine a subset of the set of points-of-interest based on the feedback; and
determine the tour route based on the subset of points-of-interest.

16. The article of claim 12, wherein neither of the tour route and the proposed route have been traversed and at least one of the first and second tour segments is included in the tour route but not the proposed route.

17. An apparatus comprising:
a memory;
a processor coupled to the memory to:
(a) acquire a tour start location, a time constraint, and a first user travel preference for a first user;
(b) determine a proposed tour route, which has not been traveled and includes first and second tour segments, based on the tour start location and the time constraint;
(c) determine a proposed route, which has not been traveled, between the tour start location and a tour end location;
(d) determine a time differential between a touring time for the tour route and a touring time for the proposed route; and
(e) communicate at least one of the first and second tour segments to the first user;
wherein (a) the first tour segment is determined based on the first user travel preference, (b) the time constraint is greater than the time differential, and (c) the first user travel preference is not the tour start location or a tour end location.

18. The apparatus of claim 17, wherein the processor is to:
determine the touring time for the proposed route; and
determine the touring time for the tour route.

19. The apparatus of claim 17, wherein the processor is to:
provide a set of points-of-interest to the first user based on the first user travel preference;
receive feedback, from the first user, regarding the set of points-of-interest;
determine a subset of the set of points-of-interest based on the feedback; and
determine the tour route based on the subset of points-of-interest.

* * * * *